(12) United States Patent
Mesarovic et al.

(10) Patent No.: US 6,885,992 B2
(45) Date of Patent: Apr. 26, 2005

(54) EFFICIENT PCM BUFFER

(75) Inventors: Vladimir Z. Mesarovic, Austin, TX (US); Miroslav V. Dokic, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 547 days.

(21) Appl. No.: 09/771,103

(22) Filed: Jan. 26, 2001

(65) Prior Publication Data

US 2002/0103635 A1 Aug. 1, 2002

(51) Int. Cl.⁷ .............................................. G10L 19/00
(52) U.S. Cl. ...................................... 704/500; 704/200
(58) Field of Search ........................... 386/96, 99, 124; 704/200, 500, 503

(56) References Cited

U.S. PATENT DOCUMENTS 6,108,584 A * 8/2000 Edwards ....................... 700/94
6,167,192 A * 12/2000 Heo ........................... 386/124
6,460,016 B1 * 10/2002 Sueyoshi et al. .......... 704/200.1

* cited by examiner

*Primary Examiner*—Daniel Abebe
(74) *Attorney, Agent, or Firm*—Thompson & Knight LLP; James J. Murphy

(57) ABSTRACT

A multi-channel digital audio decoder which receives an encoded audio signal having at least two channels and which decodes the audio signal. The digital audio decoder includes an input, which receives the encoded audio signal and a processor, which receives the encoded audio signal from the input. The processor decodes the encoded audio signal and provides decoded digital audio data. Also included is a buffer, which receives the decoded digital audio data from the processor. The buffer has a first-channel portion and a second-channel portion which have unequal sizes.

19 Claims, 6 Drawing Sheets

EFFICIENT PCM BUFFER

TECHNICAL FIELD

The embodiments described below lie generally in the field of digital audio coding and decoding. The embodiments relate specifically a system and method for implementing an audio decoding system and method using a reduced-size playable decoded digital sound data buffer, such as a reduced-size playable PCM buffer.

BACKGROUND

Audio support is provided for many modem computer, telephony, and other electronics applications. An important component in many digital audio information processing systems is the decoder. Generally, the decoder receives data in a compressed form and converts that data into a decompressed digital form. The decompressed digital data is then passed on for further processing, such as filtering, expansion or mixing, conversion into analog form, and eventually conversion into audible tones. In other words, the decoder provides the proper hardware and software interfaces to communicate with the possible compressed (and decompressed) data sources, as well as the destination digital and/or audio devices.

SUMMARY

The specification provided here describes embodiments for decoding digital audio signals. More specifically described are embodiments for minimizing the memory used in an audio decoding application for Pulse Code Modulation ("PCM") buffering, although the techniques described here could be used for digital audio data encoded using other types of modulation.

In a real-time digital audio playback system, digital signals are decoded or processed for playback. Initially, the beginning of the incoming encoded digital audio signals must be decoded before playback can begin. After processing some number of the digital samples, the decoded playback can occur. To continuously "stream" real-time audio, both processing and decoded playback must simultaneously occur, albeit for different portions of the audio signal. To accomplish this simultaneous playback and processing/decoding, a buffer for the PCM data is provided. The audio playback then occurs directly from the PCM data. The amount of PCM buffering that is provided will generally depend on how long it will take to process/decode additional digital signals. Embodiments described in this application provide a system and method for minimizing the amount of such PCM buffering.

Described is an efficient AAC filterbank and PCM buffering/playback implementation. One described PCM buffer management technique minimizes data memory requirements through the use of non-uniform size PCM buffering. These optimizations are based on AAC decoding dynamics and the available processing capacity budget.

Figure 1A:
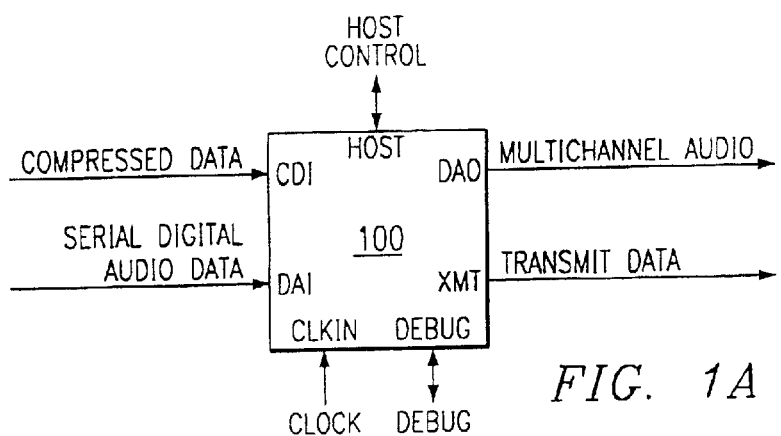
FIG. 1A is a diagram of a general multichannel audio decoder.

All of these drawings are drawings of certain embodiments. The scope of the claims are not to be limited to the specific embodiments illustrated in the drawing and described below.

DESCRIPTION OF THE PREFERRED EMBODIMENTS

FIG. 1A is a general overview of an audio information decoder 100. Decoder 100 is operable to receive data in any one of a number of formats, including compressed data conforming, for example, to the MPEG-4 AAC algorithm and AC-3 digital audio compression standard, (as defined by the United States Advanced Television System Committee) through a Compressed Data Input port ("CDI"). An independent Digital Audio Input ("DAI") port provides for the input of PCM, S/PDIF, or non-compressed digital audio data.

A digital audio output ("DAO") port provides for the output of multiple-channels of decompressed digital audio data. Independently, decoder 100 can transmit data in an S/PDIF ("Sony-Phillips Digital Interface") format, for example, through a transmit port XMT.

Decoder 100 operates under the control of a host microprocessor through a host port "HOST" and supports debugging by an external debugging system through the debug port "DEBUG." The "CLK" port supports the input of a master clock for generation of the timing signals within decoder 100.

Figure 1B:
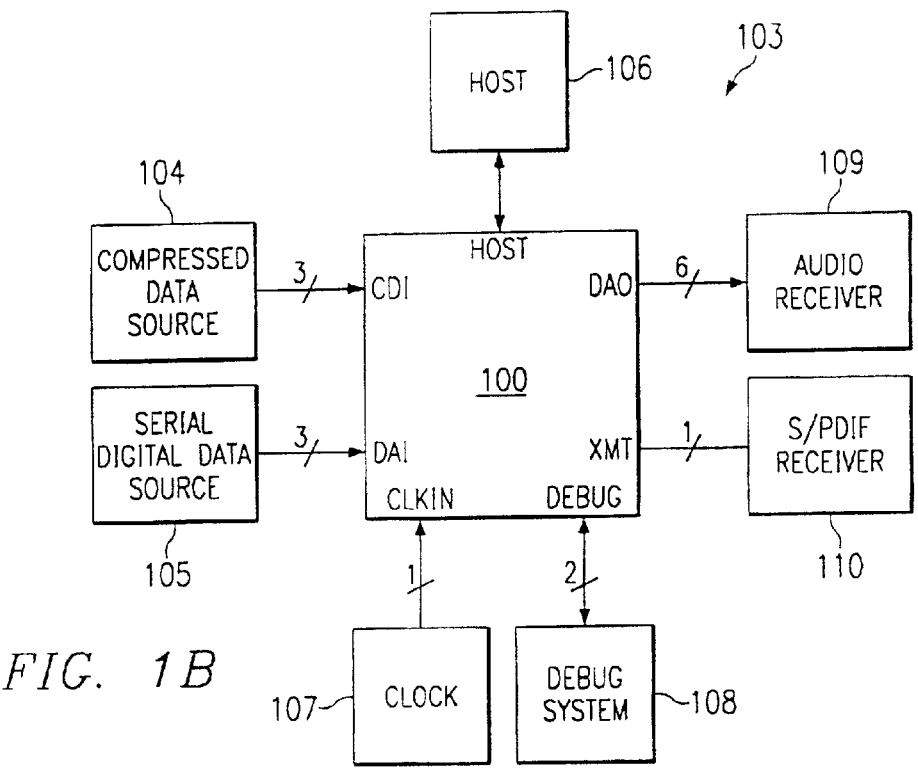
FIG. 1B is a diagram showing the decoder of FIG. 1A in an exemplary system.

FIG. 1B shows decoder 100 embodied in a representative system 103. Decoder 100 as shown includes three Compressed Data Input (CDI) pins for receiving compressed data from a compressed audio data source 104 and an additional three Digital Audio Input (DAI) pins for receiving serial digital audio data from a digital audio sources 105. Examples of compressed serial digital audio source 105, and in particular of AAC compressed digital sources, are satellite and terrestrial digital TV and radio broadcasting and internet.

The HOST port allows coupling to a host processor 106, which is generally a microcontroller or microprocessor that maintains control over the audio system 103. For instance, in one embodiment, host processor 106 is the microprocessor in a Personal Computer ("PC") and System 103 is a PC-based sound system. In another embodiment, host processor 106 is a microcontroller in an audio receiver or controller unit and system 103 is a non-PC-based entertainment system, such as conventional home entertainment systems produced by Sony, Pioneer, and others. A master clock, shown here, is generated externally by clock source 107. The DEBUG port consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to a S/PDIF receiver 110. These outputs may be coupled, for example, to digital to analog converters or codecs for transmission to analog receiver circuitry.

Figure 1C:
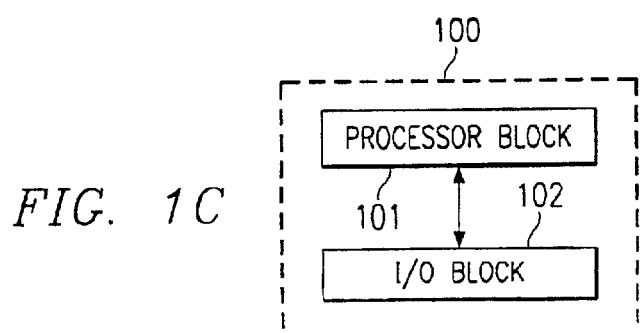
FIG. 1C is a diagram showing the partitioning of the decoder into a processor block and an input/output (I/O) block.

FIG. 1C is a high level functional block diagram of a multichannel preferred embodiment audio decoder 100. Decoder 100 is divided into two major sections, a Processor Block 101 and an I/O Block 102. Processor Block 101 includes two DSP cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
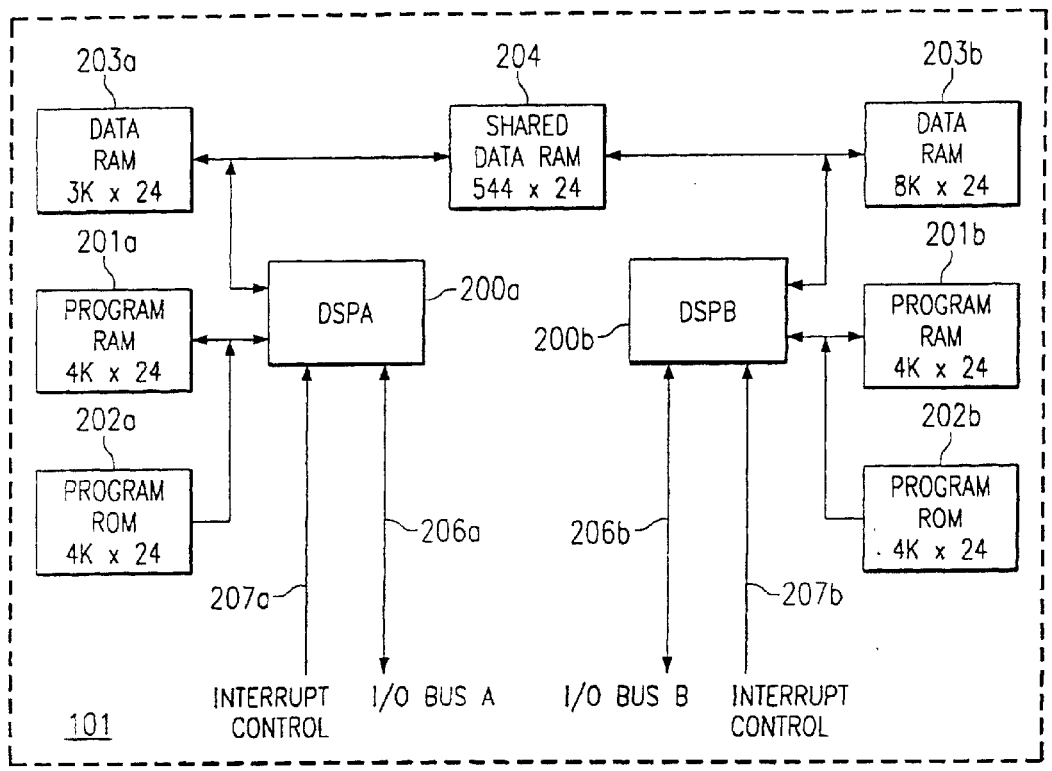
FIG. 2 is a diagram of the processor block of FIG. 1C.

FIG. 2 is a detailed functional block diagram of processor block 101. Processor block 101 includes two DSP cores 200a and 200b, labeled DSP-A and DSP-B respectively. Cores 200a and 200b preferably operate in conjunction with respective dedicated program RAM 201a and 201b, program ROM 202a and 202b, and data RAM 203a and 203b. Shared data RAM 204, which the DSPs 200a and 200b can both access, provides for the exchange of data, such as PCM data and processing coefficients, between processors 200a and 200b.

Figure 3:
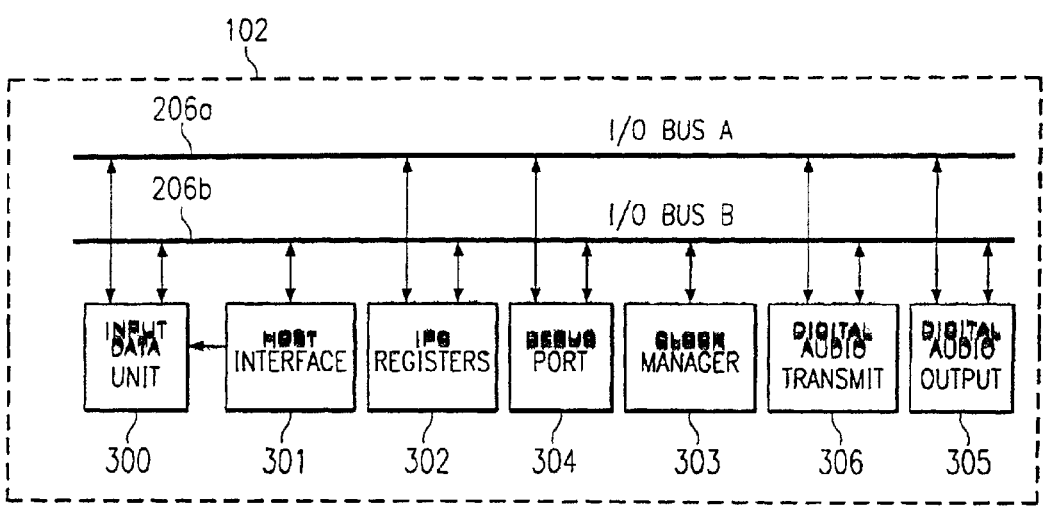
FIG. 3 is a diagram of the primary functional subblock of the I/O block of FIG. 1C.

FIG. 3 is a detailed functional block diagram of I/O block 102. Generally, I/O block 102 contains peripherals for data input, data output, communications, and control. Input Data Unit 300 accepts either compressed analog data or digital audio in any one of several input formats (from either the CDI or DAI ports). Serial/parallel host interface 301 allows an external controller to communicate with decoder 100 through the HOST port. Data received at the host interface port 301 can also be routed to Input Data Unit 300.

IPC (Inter-processor Communication) registers 302 support a control-messaging protocol for communication between processing cores 200 over a relatively low-bandwidth communication channel. High-bandwidth data can be passed between processing cores 200 via shared memory 204 in processor block 101.

Clock manager 303 is a programmable PLL/clock synthesizer that generates common audio clock rates from any selected one of a number of common input clock rates through the CLKIN port. Clock manager 303 includes an STC counter which generates time stamp information used by processor block 101 for managing playback and synchronization tasks. Clock manager 303 also includes a programmable timer to generate periodic interrupts to processor block 101.

Debug circuitry 304 is provided to assist in applications development and system debug using an external DEBUGGER and the DEBUG port, as well as providing a mechanism to monitor system functions during device operation.

A Digital Audio Output port 305 provides multichannel digital audio output in selected standard digital audio formats, such as the AAC audio coding format. A Digital Audio Transmitter 306 provides digital audio output in formats compatible with S/PDIF or AES/EBU.

In general, I/O registers are visible on both I/O buses, allowing access by either DSP-A (200a) or DSP-B (200b).

Any read or write conflicts are resolved by treating DSP-B as the master and ignoring DSP-A.

In the discussion below, the AAC decoding approach is discussed for understanding the utility and advantages of the concepts claimed below. The actual claims, however, will determine the scope of the applicants' invention.

The AAC approach provides a number of useful functions. For example, the AAC approach provides for a speed change functionality, which allows the change of the time scale without altering the pitch during the decoding process. This approach can, for example, be used to implement a "fast forward" function (data base search) or to adapt the length of an audio sequence to a given video sequence. A pitch change functionality allows the change of the pitch without altering the time scale during the encoding or decoding process. This can be used for example for voice alteration or Karaoke-type applications. Bit rate scalability allows a bitstream to be parsed into a bitstream of lower bit rate, such that the combination can still be decoded into a meaningful signal. The bit stream parsing can occur either during transmission or in the decoder. Bandwidth scalability is a particular case of bitrate scalability, whereby part of a bitstream representing a part of the frequency spectrum can be discarded during transmission or decoding. Encoder complexity scalability allows encoders of different complexity to generate valid and meaningful bitstreams. Decoder complexity scalability allows a given bitstream to be decoded by decoders of different levels of complexity. The audio quality, in general, is related to the complexity of the encoder and decoder used. Error robustness provides the ability for a decoder to avoid or conceal audible distortion caused by transmission errors.

The AAC encoded signals are reconstructed into PCM samples, which are temporarily stored in PCM buffers, and sent to output FIFOs for playback. Given the dynamics of the AAC decode and the available MIPS, the PCM buffers and the output FIFOs have to be designed properly. The output FIFOs act as Direct Memory Access ("DMA") engines, feeding decompressed audio data to Digital-to-Analog Converters ("DACs"), and are designed at the hardware level, while the PCM buffers are the PCM sample reserves created in software to smooth out the data delivery-decode-playback dynamics. Preferably, the output FIFOs are chosen to be a 32-sample (24-bit) size.

Figure 4:
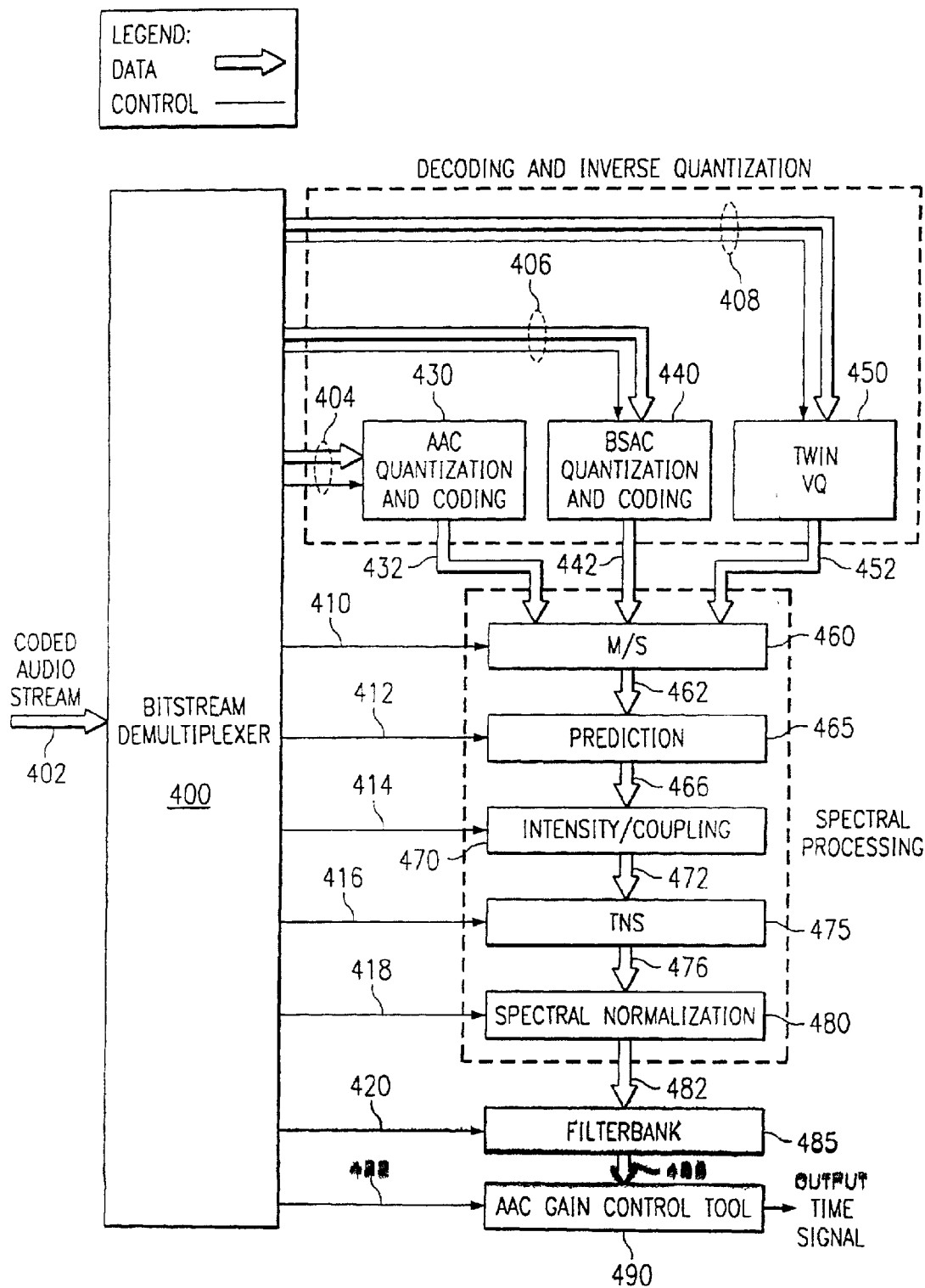
FIG. 4 is a functional diagram of an audio decoding architecture and method.

A preferred embodiment coding/decoding architecture is shown in FIG. 4. The data flow in this diagram is from left to right and from top to bottom. The preferred functions of the decoder are to find the description of the quantized audio spectra in the bitstream, decode the quantized values and other reconstruction information, reconstruct the quantized spectra, process the reconstructed spectra through whatever tools are active in the bitstream in order to arrive at the actual signal spectra as described by the input bitstream, and finally convert the frequency domain spectra to the time domain, with or without an optional gain control tool. Following the initial reconstruction and scaling of the spectrum reconstruction, other circuitry can be used to modify one or more of the spectra in order to provide more efficient coding. Preferably for these additional circuits, there is maintained an option to "pass through" the data without spectral modification.

The input to the bitstream demultiplexer tool 400 is the MPEG-4 T/F bitstream 402. The demultiplexer separates the bitstream into the parts for each tool, and provides each of the tools with the bitstream information related to that tool.

The output from the bitstream demultiplexer tool 400 is preferably the quantized (and preferably noiselessly coded)

spectra represented by: (1) either the sectioning information and the noiselessly coded spectra 404 (AAC) or the Bit-Sliced Arithmetic Coding ("BSAC") information 406 or a set of indices of code vectors 408 (Twin VQ); (2) the M/S decision information 410; (3) the predictor state information 412; (3) the perceptual noise substitution (PNS) information; (4) the intensity stereo control information and coupling channel control information 414; (5) (TNS) information 416; (6) the filterbank control information 420; and (7) the gain control information 422.

The AAC noiseless decoding tool 430 takes information from the bitstream demultiplexer 400, parses that information, decodes the Huffman coded data, and reconstructs the quantized spectra and the Huffman and DPCM coded scalefactors.

The inputs to the noiseless decoding tool 430 are the sectioning information for the noiselessly coded spectra and the noiselessly coded spectra 404. The outputs of the noiseless decoding tool are the decoded integer representation of the scalefactors and the quantized values for the spectra 432.

The BSAC tool 440 provides an alternative to the AAC noiseless coding tool, which provides fine granule scalability. This tool takes information from bitstream demultiplexer 400, parses that information, decodes the arithmetic-coded bit-sliced data, and reconstructs the quantized spectra and the scalefactors. The inputs to the BSAC decoding tool are the noiselessly coded bit-sliced data and the target layer information to be decoded 400. The outputs from the BSAC decoding tool are the decoded integer representation of the scalefactors and the quantized value for the spectra 442.

The inverse quantizer tool takes the quantized values for the spectra, which were generated by the AAC noiseless decoding tool 430 or the BSAC tool 440, and converts the integer values to non-scaled, reconstructed spectra. This quantizer is a non-uniform quantizer. The input to the Inverse Quantizer tool is the quantized values for the spectra and the output of the inverse quantizer tool is the unscaled, inversely quantized spectra. The scalefactor tool converts the integer representation of the scalefactors to the actual values, and multiplies the un-scaled inversely quantized spectra by the relevant scalefactors. The inputs to the scalefactors tool are the decoded integer representation of the scalefactors and the unscaled, inversely quantized spectra. The output from the scalefactors tool is the scaled, inversely quantized spectra.

The M/S tool 460 converts spectra pairs from Mid/Side to Left/Right under control of the M/S decision information 410, improving stereo imaging quality and sometimes providing coding efficiency. The inputs to the M/S tool are the M/S decision information 410 and the scaled, inversely quantized spectra related to pairs of channels. The output from the M/S tool is the scaled, inversely quantized spectra (432, 442, 452) related to pairs of channels, after M/S decoding.

The scaled, inversely quantized spectra of individually coded channels are not processed by the M/S block, rather they are passed directly through the block without modification. If the M/S block is not active, all spectra are passed through this block unmodified.

The prediction tool 465 reverses the prediction process carried out at the encoder. This prediction process re-inserts the redundancy that was extracted by the prediction tool at the encoder, under the control of the predictor state information. This tool is implemented as a second-order backward adaptive predictor. The inputs to the prediction tool are the predictor state information 412 and the scaled, inversely quantized spectra 462. The output from the prediction tool is the scaled, inversely quantized spectra, after prediction is applied 466. If the prediction is disabled, the scaled, inversely quantized spectra are preferably passed directly through the block without modification. Alternatively, there is a low-complexity prediction mode and a long-term predictor provided.

The Perceptual Noise Substitution ("PNS") tool (not shown) implements noise substitution decoding on channel spectra by providing an efficient representation for noise-like signal components. The inputs to the perceptual noise substitution tool are the inversely quantized spectra and the perceptual noise substitution control information. The output from the perceptual noise substitution tool is the inversely quantized spectra. If either part of this block is disabled, the scaled, inversely quantized spectra are preferably passed directly through this part without modification. If the perceptual noise substitution block is not active, all spectra are passed through this block unmodified.

The intensity stereo/coupling tool 470 implements intensity stereo decoding on pairs of spectra. In addition, it adds the relevant data from a dependently switched coupling channel to the spectra at this point, as directed by the coupling control information 414. The inputs to the intensity stereo/coupling tool are the inversely quantized spectra 466 and the intensity stereo control information and coupling control information 414. The output from the intensity stereo/coupling tool is the inversely quantized spectra after intensity and coupling channel decoding 472. If either part of this block is disabled, the scaled, inversely quantized spectra are preferably passed directly through this part without modification. The intensity stereo tool and M/S tools are arranged so that the operation of M/S and Intensity stereo are mutually exclusive on any given scalefactor band and group of one pair of spectra.

The (TNS) tool 475 implements a control of the fine time structure of the coding noise. In the encoder, the TNS process has flattened the temporal envelope of the signal to which it has been applied. In the decoder, the inverse process is used to restore the actual temporal envelope(s), under control of the TNS information. This is done by applying a filtering process to parts of the spectral data. The inputs to the TNS tool are the inversely quantized spectra 472 and the TNS information 416. The output from the TNS block is the inversely quantized spectra 476. If this block is disabled, the inversely quantized spectra are preferably passed through without modification.

The filterbank tool 485 applies the inverse of the frequency mapping that was carried out in the encoder, as indicated by the filterbank control information 420 and the presence or absence of gain control information. An IMDCT is preferably used for the filterbank tool. If the gain control tool is not used, the IMDCT in the standard AAC mode input preferably consists of either 1024 or 128 spectral coefficients, depending of the value of window_sequence. If the gain control tool is used, the filterbank tool is preferably configured to use four sets of either 256 or 32 coefficients, depending of the value of window_sequence.

The inputs to the filterbank tool are the inversely quantized spectra 476 and the filterbank control information 420. The output(s) from the filterbank tool is (are) the time domain reconstructed audio signal(s) 486. The filterbank tool may be constructed from different configurations: a) 1024 or 128 shift-length-type with the option to select two window shapes (AAC); b) 4× switchable 256 or 32 shift-length-type with the option to select two window shapes (AAC); c) 2048 or 512 or 128 shift-length-type with a sine window as defined for Twin VQ; and d) 960 or 120 shift-length-type with the option to select two window shapes (AAC-derived).

When present, the gain control tool (not shown) applies a separate time domain gain control to each of 4 frequency bands that have been created by the gain control PQF filterbank in the encoder. Then, it assembles the 4 frequency bands and reconstructs the time waveform through the gain control tool's filterbank.

The inputs to the gain control tool are the time domain reconstructed audio signal(s) and the gain control information. The output from the gain control tool is the time domain reconstructed audio signal(s). If the gain control tool is not active, the time domain reconstructed audio signal(s) are passed directly from the filterbank tool to the output of the decoder. This tool is used for the Scaleable Sampling Rate ("SSR") profile only.

The spectral normalization tool 480 converts the reconstructed flat spectra 476 to the actual values at the decoder. The spectral envelope is specified by LPC coefficients, a Bark scale envelope, periodic pulse components, and gain. The input to the spectral normalization tool is the reconstructed flat spectra 476. The output from the spectral normalization tool is the reconstructed actual spectra 482.

The Twin VQ 450 tool converts the vector index to a flattened spectra at the decoder by means of table look-up of the codebook and inverse interleaving. Quantization noise is minimized by a weighted distortion measure at the encoder instead of an adaptive bit allocation. This is an alternative to the AAC quantization tool. The input to the Twin VQ tool is a set of indices of the code vector 408. The output from the Twin VQ tool is the reconstructed actual spectra 452.

The above audio coding/decoding tools are used, for example, in the AAC architecture specification which is set out in the ISO/IEC CD 14496-3 Subpart 4 Standard, entitled "Information Technology—Coding of Audiovisual Objects; Part 3: Audio; Subpart 4: Time/Frequency Coding, dated May 15, 1998, which is incorporated by reference herein.

AAC algorithms use large and very flexible filterbanks to perform the time and frequency representation of the signal. For example, both 128- and 1024-sample windows are utilized in AAC's filterbank. The 128-sample windows (short windows) are preferably used to capture transients, while the 1024-sample windows (long windows) are preferably utilized to achieve high compression ratios and good frequency resolution for stationary signals. Furthermore, transitions from long to short (and vice versa) windows are supported.

Figure 5:
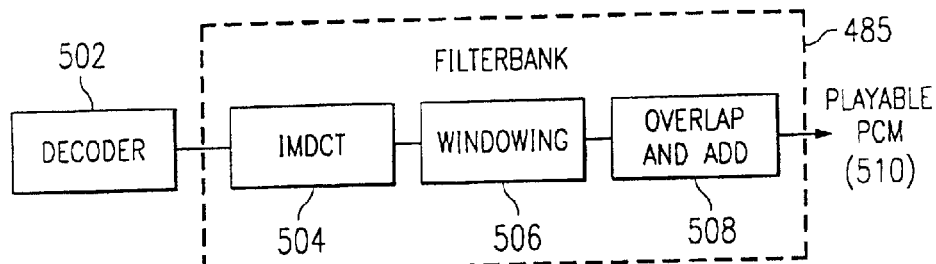
FIG. 5 is a functional diagram of an AAC filterbank and reconstruction algorithm portion of an exemplary output channel in an audio decoding architecture.

A single-channel of the 1024-sample filterbank reconstruction algorithm is illustrated in FIG. 5. At the decoder side, for each channel, the 1024 time-frequency values from the decoder 502 may be, for example, transformed into 2048 time domain values via the inverse modified discrete cosine transform (IMDCT) 504. After windowing at block 506, the first half (1024 samples) of the 2048 time domain values is added to the second half of the previous block (the "history data" from the previous IMDCT) to reconstruct the current playable PCM samples at the overlap-and-add block 508. At block 508, in other words, the 1024 samples from the previous block, which were kept in data memory as "history data," are overwritten with the second half of the IMDCT output after playable PCM samples 510 are produced. Collectively, blocks 504, 506 and 508 are referred to as the filterbank 485. The second half of the current block is again used as "history data" in overlap-and-add step of the next cycle.

Figure 6:
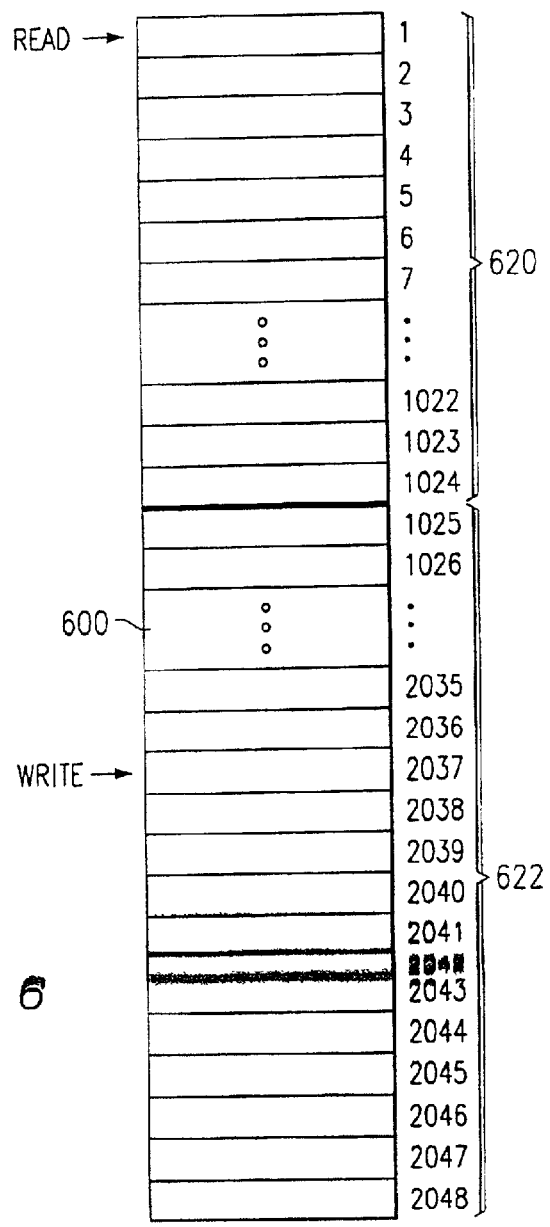
FIG. 6 is a functional diagram of an exemplary output buffer for a single channel of an audio decoding architecture.

FIG. 6 illustrates an exemplary circular PCM output buffer 600. Note that if this buffer were 1024 samples long, there would be no place to store the next 1024-sample block until the last playable PCM sample had been sent to the audio output of the decoding architecture.

Conceptually, the buffer could be thought of as having a top half 610 and a bottom half 612, which in this example where the production size is 1024 words, each half would comprise 1 k or 1024 words. A write pointer 604 is provided, which indexes the writing of the 1024-sample blocks. A read pointer 608 is also provided, which indexes the reading of the playable PCM samples to the audio decoding circuitry. The buffer 600 is preferably a circular buffer, which means that when the write and read pointers 604, 608 reach the buffer maximum value, they wrap around again to the start of the buffer. If infinite MIPS were available, the next 1024 sample block could be placed into the buffer at the instant which the last PCM sample were output, and the playback could immediately continue. Realistically, however, circuit designers typically provide a buffer as shown in FIG. 6, which is twice the size of the 1024-sample production.

Total buffering requirements can be substantial. For example, without allowing for the above doubling to 2048 of the 1024-word production size, a 1024-word data memory buffer (per channel) may be allocated for storing playable PCM samples. Once the 1024-word sample has been stored for each channel of an exemplary 6-channel system, then the decoder has enough PCM samples to play for the duration of the whole block (21.3 ms at the Fs=48 KHz, for example). Six channels at 1024-samples, yields an ideal (infinite MIPS) buffer size of 6*1024=6144 words.

During the time in which a block of PCM samples are played, if there is no additional buffering, the AAC decoder will have to produce another 1024 PCM samples per channel and fill-up the playable PCM buffers immediately within one sample period before underflowing begins. In other words, unless further buffering is provided, there will be no place to put the other set of 1024 PCM samples until the last sample is played, and a near-infinite MIPs architecture will be required in order to re-establish the 1024 samples in the buffer before the PCM output will underflow and real-time PCM play will fail. To overcome this problem, then, thus, the size of the playable PCM buffers is typically chosen to be twice the size of the production granularity, which in case of AAC is equal to the 1024 samples. Thus, using this approach, the playable PCM buffer would be 2048 samples for each channel.

Figure 7:
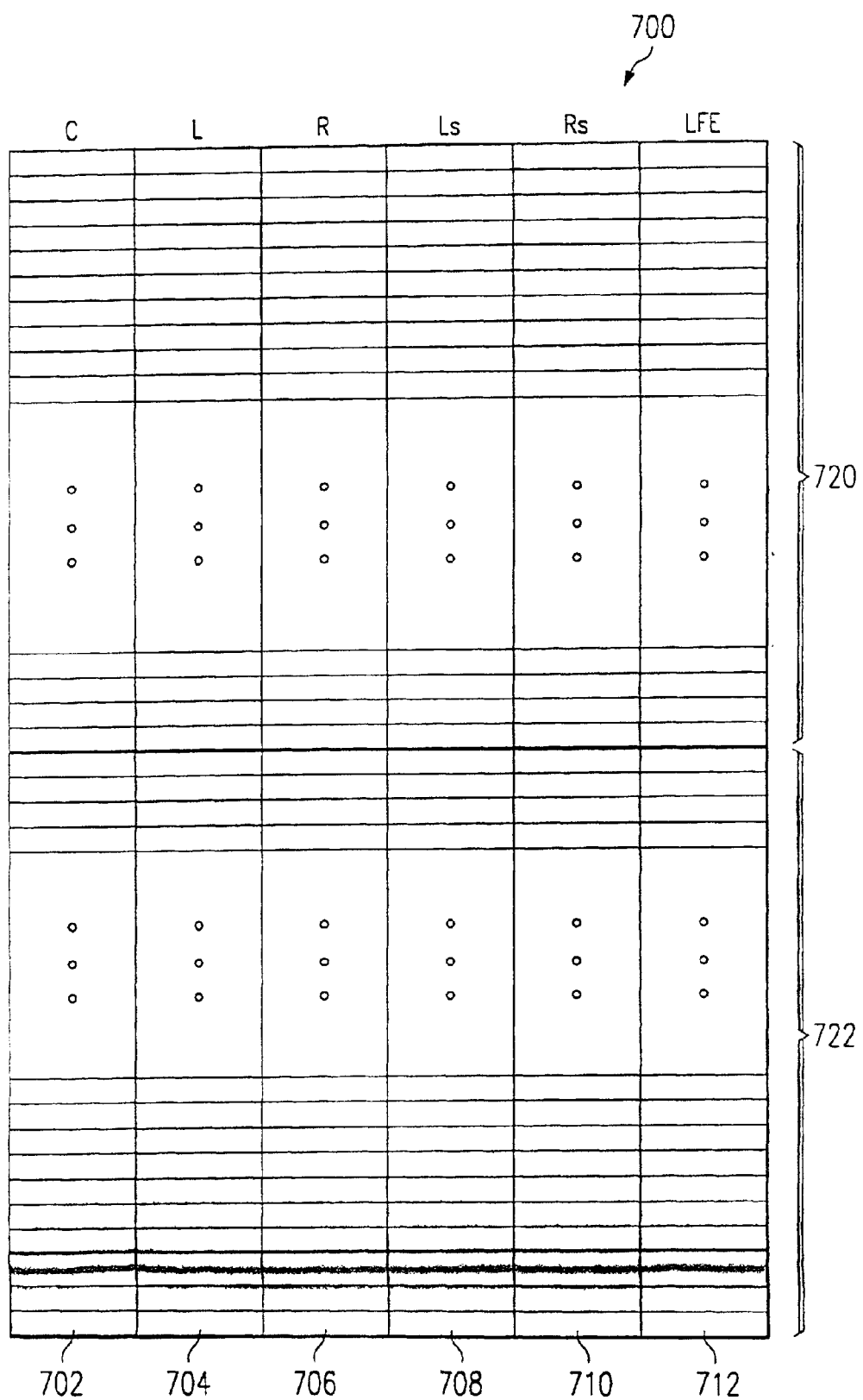
FIG. 7 is a functional diagram of a six-channel output buffer using fixed-size buffering.

FIG. 7 illustrates the playable PCM buffering which, following the approach above, uses twice as many memory locations for each channel as the production sample size in the audio decoding system. In this example, the channel buffers (collectively, 700) are laid out in typical order by which the channels are transmitted in a bitstream. First channel 702 is the "Center" channel; second channel 704 is the "Left" channel; third channel 706 is the "Right" channel; fourth channel 708 is the "Left surround" channel; fifth channel 710 is the "Right surround" channel; and sixth channel 712 is the "Low Frequency Effect" channel. In this example, each buffer 702–712 contains 2048 words of playable PCM.

As is seen above, the buffering requirements are heightened in a multiple-channel architecture. For example, if the channels are decoded sequentially (same way they are transmitted in the bitstream), the decoder will need some time to decode each channel. After decoding the first channel of the next block, the decoder will stall until space for 1024 samples is available in the playable PCM buffer, as the decoder typically must drop its entire production of 1024 samples into the buffer in one fell swoop. Waiting for there to be room to store the 1024 samples, the decoder will have to wait, wasting MIPS, until the playable PCM buffer of the first channel 702 is empty, before storing its freshly produced batch of PCM samples. At the same time, playable PCM buffers for all other channels 704–712 will be underflowing.

Since all channels must play simultaneously, unless additional buffering is provided, the entire contents of all six channels must be depleted before loading the new 1024-sample blocks of PCM data. Again, the conventional approach for dealing with the difficulty of decoding and loading all incoming data into the playable PCM buffer is to provide twice the production size available on all channels for PCM buffering as shown here in FIG. 7.

Figure 8:
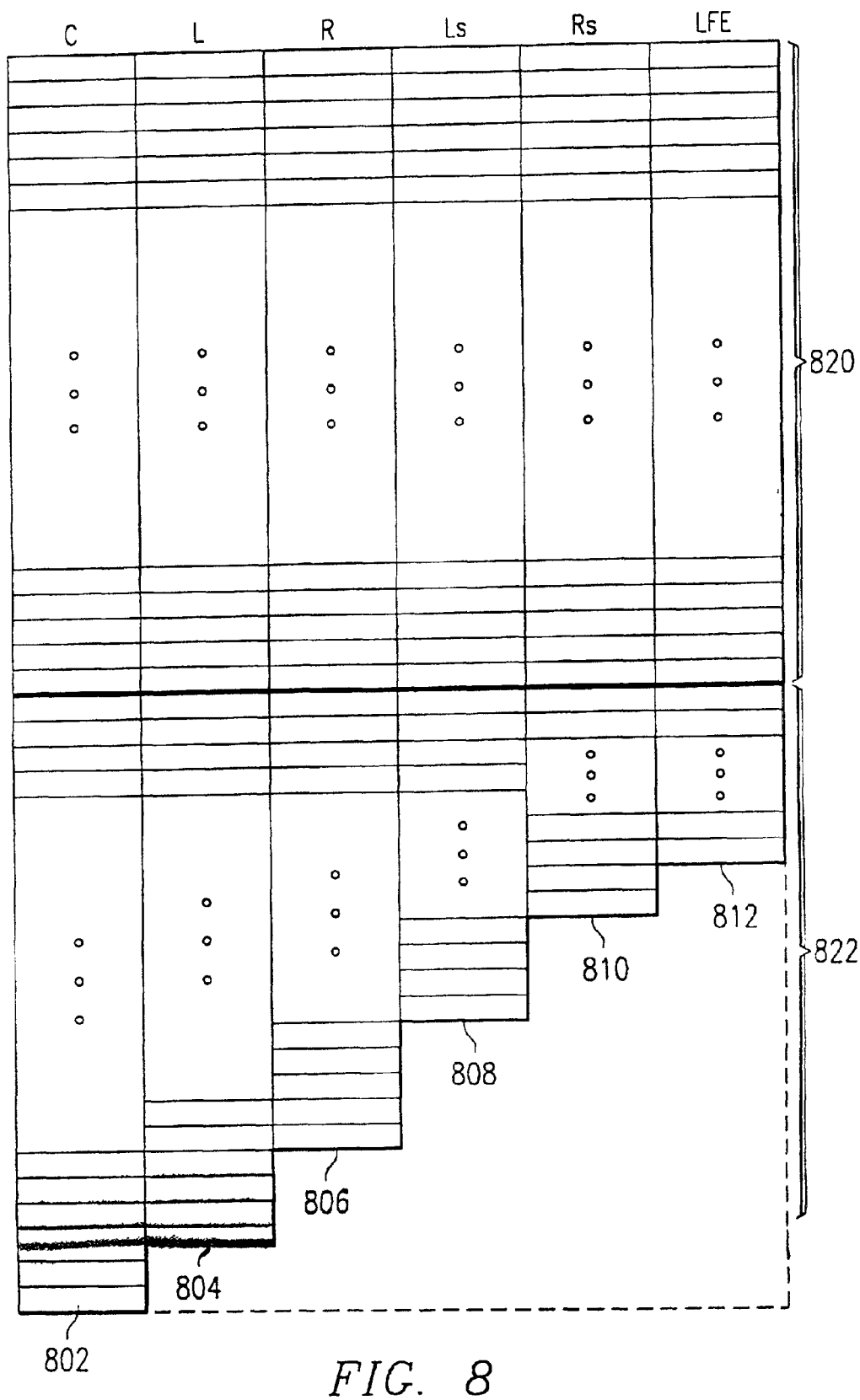
FIG. 8 is a functional diagram of a six-channel output buffer using variable-size buffering.

FIG. 8 illustrates a flexible-size PCM buffering approach which reduces the total size of playable PCM buffering to less than the typical 12K words which would be required for a six-channel architecture. This approach takes advantage of the fact that in a multi-channel architecture, the MIPS budget of the decoder is typically underutilized. The underutilization arises from the fact that in a steady-state AAC decoding application, the PCM buffers contain certain amount of PCM samples which are being played back, while the DSP is working on producing the next data block, which in this example is another 1024 samples.

To avoid DSP waiting time (loss of MIPS), the first decoded channel in the block needs to have a large enough playable PCM buffer 802 to allow the DSP to dump the decoded PCM samples as soon as possible. While DSP is decoding the next channel in the block, the PCM playback is happening (simultaneously on all 6 channels) making more space in playable PCM buffers 804–812 for next channels. So, by the time the second channel is decoded, more space will be available in the second PCM buffer 804. Consequently, for the second channel in the block, less memory needs to be statically allocated for the PCM buffer, and so on. In this fashion, the playable PCM buffer sizes can be defined in the decreasing order to make advantage of the decode dynamics. This approach will be designed for the worst-case bitstream and a preferably known channel decode order.

For example, under an exemplary 5.1 AAC decoding multi-channel format, the channels arrive in the following order: center (C), left (L), right (R), left surround (Ls), right surround (Rs), and low-frequency effect (LFE). Since the C channel arrives first in the stream, as described above the C channel buffer 802 is maximized, for example, to 2×1024 words. Then, since the L channel is decoded next, its decode time is preferably estimated for the worst-case encoding and sample rate, and this time is converted into number of playable PCM samples. The L Channel PCM buffer size 804 is thus made smaller than the PCM buffer for C channel by the number of samples that occur during that L-channel decode time, since PCM samples from all 6 PCM buffers will be played back during the L channel decode. Similarly, the size of PCM buffer for each channel decoded subsequently can be decreased from the previous channel PCM buffer.

Still referring to FIG. 8, for example, and assuming that the same amount of time is needed to produce each channel, the actual decoding time for each channel is approximately 1024/6; 170 PCM samples played at a certain sampling frequency. The total PCM memory savings could be calculated as follows in this example: On 5 channels (all but the C channel), 170 memory locations are saved per channel; on 4 channels (all but the C and L channels), still another 170 memory locations are saved per channel; on 3 channels, still another 170 memory locations are saved per channel; on 2 channels, still another 170 memory locations are saved per channel, and on the last channel, the LFE channel, still another 170 memory locations are saved. In total, 2550 memory locations are saved by the variable-size PCM buffer approach in this example.

Typically, DSPs are designed with more MIPS power than is needed for core AAC decode. The left-over MIPS are typically used to perform post-processing on decoded PCM samples. Examples of post-processing functions are bass management, ProLogic, delays, and tone control, to name just a few. If the designer or implementor of the audio decoding system is willing to give up some of these post-processing functions (or spare MIPS are available after post-processing), the leftover MIPS could be used to further decrease the PCM buffer sizes. For example, if DSP takes 75 percent of block time to completely process the whole block, the size of all PCM buffers except for the smallest one can be further reduced by one quarter of a block length, which amounts to 5*256=1280 memory locations. Thus, the total PCM buffering requirement is reduced from 12288 to 8458 words, which is a saving of 3830 memory locations Described in this specification are circuits and methods which allow for the construction, operation and use of a dual processor audio decoder (decompressor). Such a dual processor audio device preferable provides a speed advantage over any of the prior art audio devices. Additionally, the principles of the present invention allow for the designer using such a device substantial flexibility through software manipulation.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

For example, although AAC decoding is described as the digital audio decoding application above, the principles described above can be applied to other formats of encoded digital audio data. Different functions described above may be implemented in hardware, software, or firmware. The described processing cores may be general purposes microprocessors or Reduced Instruction Set Computers ("RISC"), the latter of which would specifically include DSPs. In any instance, the specific elements of the embodiments described above can often be replaced by other elements which can perform the described functions. It is therefore, contemplated that the claims will cover such modifications or embodiments.

What is claimed:

1. A multi-channel digital audio decoder for receiving an encoded audio signal having at least two channels and for decoding the encoded audio signal, the digital audio decoder comprising:

(a) an input which receives the encoded audio signal;

(b) a processor which receives the encoded audio signal from the input decodes at the least two channels of the encoded audio signal, and provides at least two channels of decoded digital audio data; and (c) a buffer which receives the at least two channels of decoded digital audio data from the processor, the buffer having at least a first-channel portion and a second-channel portion wherein the first-channel portion is defined to have a size which is not equal to the size of the second-channel portion, and wherein a difference in size between the first-channel portion and the second channel-portion is proportional to a decode time of a selected one of the two channels of the encoded audio data.

2. The digital audio decoder of claim 1 wherein the decoded digital audio data is playable PCM data.

3. The digital audio decoder of claim 1 wherein the processor is further operable to perform post-processing on the decoded digital audio data before passing the data on to the buffer.

4. The digital audio decoder of claim 1 wherein the first-channel portion of the buffer stores the first-channel data of the decoded digital audio data which was decoded by the processor from the earlier arriving channel of the at least two channels of the encoded audio signal and the second-channel portion of the buffer stores the second-channel data of the decoded digital audio data which was decoded by the processor from the later arriving channel of the at least two channels of the encoded audio signal.

5. The digital audio decoder of claim 4 wherein the first-channel portion of the buffer has a larger storage capacity than does the second-channel portion.

6. The digital audio decoder of claim 1 wherein the encoded audio signal is an AAC-encoded signal.

7. The digital audio decoder of claim 1 wherein the encoded audio signal comprises six channels and wherein the processor decodes the six channels and wherein the buffer receives the six channels of decoded digital audio data and stores it in six portions of the buffer, the six portions including the unequally sized first-channel and second-channel portions.

8. The audio decoder of claim 7 wherein the six portions of the buffer are arranged in order of generally decreasing size according to the order of arrival of the respective channels in the encoded audio signal.

9. The audio decoder of claim 8 wherein the first-channel portion of the buffer receives a decoded Center channel signal from the processor, the second-channel portion of the buffer receives a decoded Left channel signal, the third-channel portion of the buffer receives a Right channel signal, the fourth-channel portion of the buffer receives a Right Surround channel signal, the fifth-channel portion of the buffer receives a Left Surround channel signal, and the sixth-channel portion of the buffer receives a Low Frequency Effect channel signal.

10. A multi-channel audio decoder for receiving an encoded audio signal having at least six channels and decoding the encoded audio signal, the audio decoder comprising;

(a) an input that receives the encoded audio signal;

(b) a processor which receives the encoded signal from the input and decodes the at least six channels of the encoded audio signal and provides at least six channels of decoded digital audio data; and (c) a buffer which receives the at least six channels of decoded audio data from the processor, said buffer having at least a first-, a second-, a third-, a fourth-, a fifth-, and a sixth-channel portion, wherein at least two portions of the first through sixth-channel portions are defined to have differing sizes proportional to decode times of at least two of the six channels of the encoded audio signal.

11. The audio decoder of claim 10 wherein the first-through sixth-channel portions store decoded audio data corresponding to the first- through sixth-arriving channels of the encoded audio signal.

12. The audio decoder of claim 11 wherein the six portions of the buffer generally decrease in size from the first- to the sixth-channel portions.

13. The audio decoder of claim 12 wherein at least two of the portions are of equal sizes.

14. The audio decoder of claim 12 wherein at least one portion has a size greater than at least one of the other portion having a lower channel number than the at least one portion.

15. A method for decoding an encoded digital audio signal having at least two channels, the method comprising:

(a) providing a buffer having at least a first-channel portion and a second-channel portion, the first-channel portion defined to have more storage locations than the second channel portion, a number of storage locations in the second-channel portion proportional to a decode time of one of the at least two channels of the encoded audio signal, the portions of the buffer further being defined to have circular addressing whereby once the end addresses of the respective portions are reached, the addressing of those portions continues, when incremented, at their beginning addresses;

(b) receiving the encoded digital audio signal, the first-channel of the encoded digital audio signal arriving before the second channel;

(c) decoding the encoded audio signal and providing a first block of decoded first-channel audio data and a first block of decoded second-channel audio data;

(d) storing the first block of decoded first-channel audio data in the first-channel portion of the buffer and the first block of decoded second-channel audio data in the second-channel portion of the buffer;

(e) retrieving playable decoded audio data from the first blocks of data stored in the first- and second-channel portions of the buffer, thereby simultaneously emptying the playable decoded audio data from the beginning addresses of the first- and second-channel portions of the buffer;

(f) continuing to decode the encoded audio signal to provide a second block of decoded first-channel audio data;

(g) storing the second block of decoded first-channel audio data in the first-channel portion of the buffer and beginning at an address following the last storage location used by the first block of decoded first-channel audio data;

(h) continuing to retrieve playable decoded audio data stored in the first- and second-channel portions of the buffer during the decoding and storing of the second block of first-channel data, thereby continuing to simultaneously empty the playable decoded audio data from addresses increased from their previous beginning addresses;

(i) continuing to decode the encoded audio data to provide a second block of decoded second-channel audio data;

(j) storing the second block of decoded second-channel audio data in the second-channel portion of the buffer and beginning at an address following the last storage location used by the first block of decoded second-channel audio data, the storing of the second block of decoded second-channel audio data wrapping around to the beginning address of the second-channel portion from a lower end address than was done when storing first-channel audio data in the first portion.

16. The method of claim 15 wherein the decoded digital audio data is playable PCM data.

17. The method of claim 15 wherein the encoded audio signal is an AAC-encoded signal.

18. The method of claim 15 wherein the encoded audio signal comprises six channels and wherein the buffer is provided having first- through sixth-channel portions of generally decreasing size from the first- to the sixth-channel portions.

19. The method of claim 18 when at least one relatively lower-numbered channel portions has a size greater than another, relatively higher-numbered channel portion.

* * * * *